Feb. 7, 1967  D. E. SUNDERLIN  3,302,742
STEERING COUPLING FOR TWO TRACTORS
Filed April 19, 1965  2 Sheets-Sheet 2
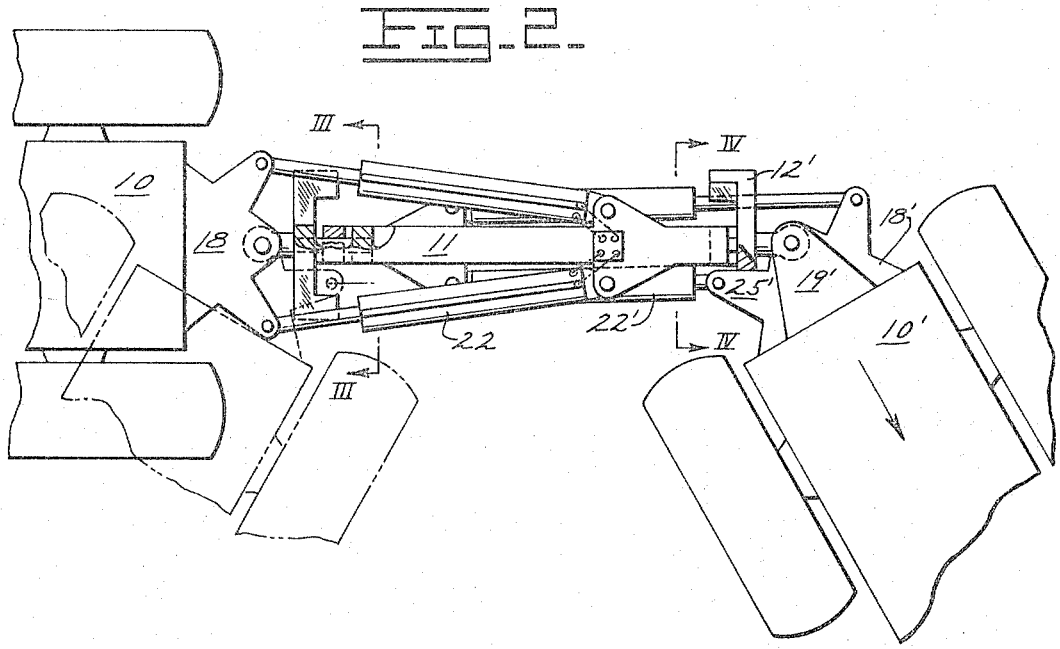
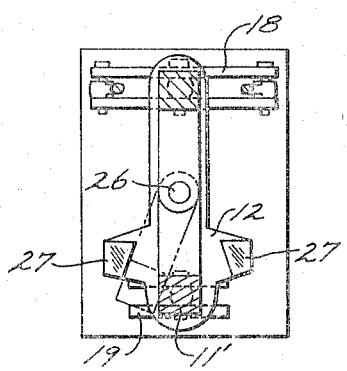
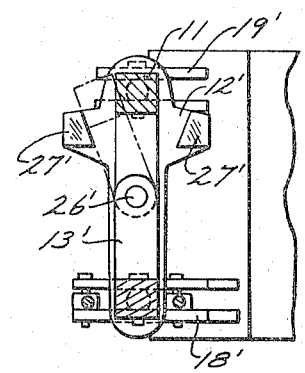
INVENTOR.
DONALD E. SUNDERLIN
BY
ATTORNEYS

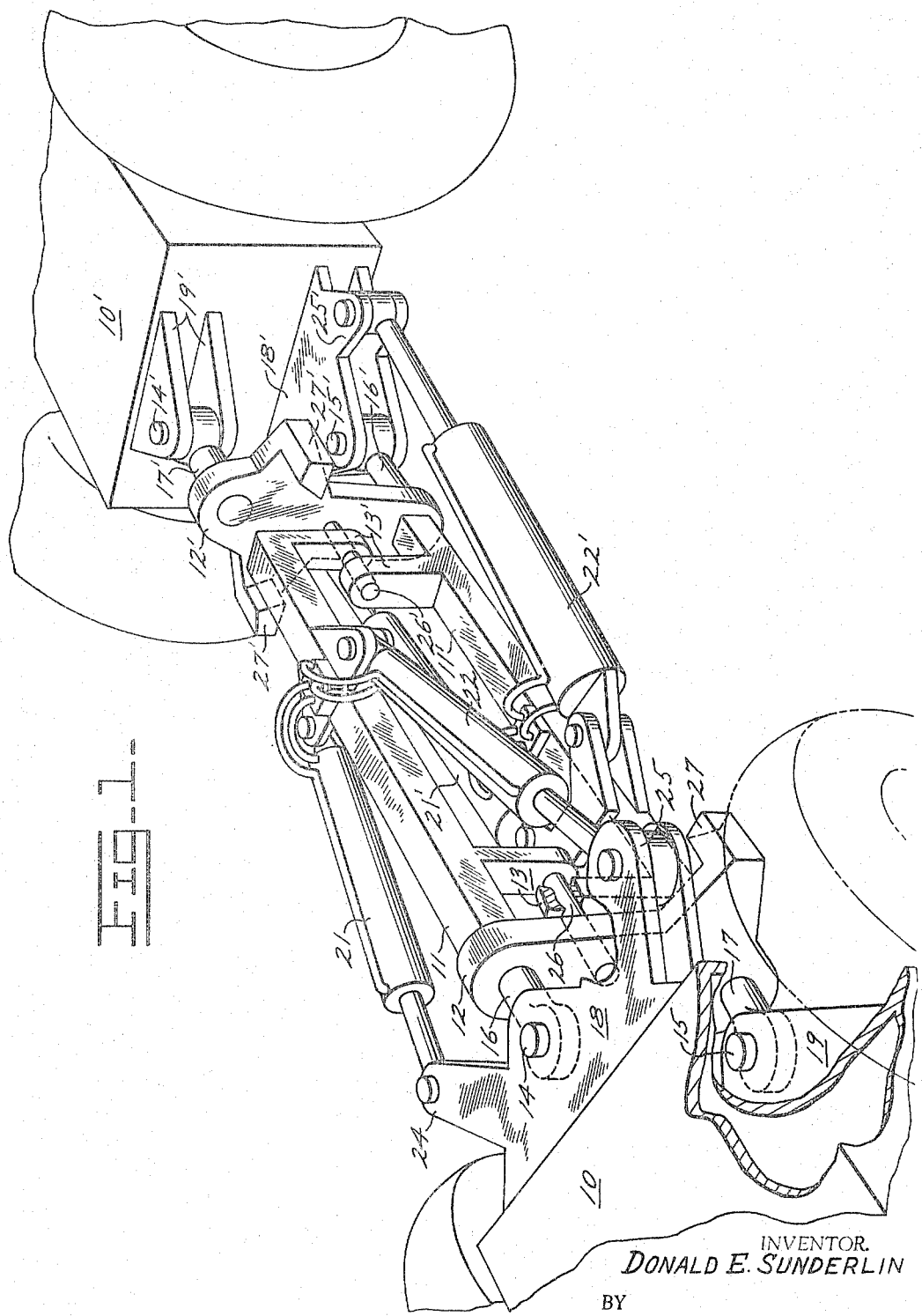

3,302,742
STEERING COUPLING FOR TWO TRACTORS
Donald E. Sunderlin, Washington, Ill., assignor to Caterpillar Tractor Co., Peoria, Ill., a corporation of California
Filed Apr. 19, 1965, Ser. No. 449,225
2 Claims. (Cl. 180—79.2)

This invention relates to means for coupling two two-wheel tractors together for use as a single machine and to means for effecting steering of one or both tractors.

There are currently many requirements for tractors of greater size and power than those now available. The manufacture of machines much larger than those now used has been deterred by their high cost, their lack of versatility and their great bulk which makes them awkward to transport from one job to another. It is, therefore, desirable to provide means for combining two tractors to enable the use of their combined power under control of a single operator. Efforts to accomplish this have resulted in machines which are awkward to operate and costly because of the large coupling means employed.

It is the object of the present invention to provide a coupling and steering mechanism for use between two large two-wheel tractors which is relatively small and inexpensive and which may be readily detached when it is desired to use the tractors singly for conventional purposes.

Further and more specific objects and its advantages are made apparent in the following specification wherein reference is made to the accompanying drawings.

In the drawings:

FIG. 1 is a perspective view of the coupling and steering mechanism of the present invention illustrating it as connecting two tractors which are only partially shown;

FIG. 2 is a plan view of the same coupling and steering mechanism illustrating positions occupied by the tractors during steering;

FIGS. 3 and 4 are sections taken on lines III—III and IV—IV respectively of FIG. 2 and showing stop mechanisms which limit relative rotation of the tractors about a common longitudinal axis.

The tractors are of the two-wheel type commonly used in connection with a two-wheel scraper or two-wheel wagon and are shown as connected together back to back though both tractors may face in the same direction if desired. Since the tractors are connected together by two nearly identical beams each of which is capable of being moved angularly or steered with respect to its own tractor, like numbers with one primed will be employed as reference characters in describing the like parts associated with the separate tractors.

In FIG. 1, a rear tractor 10 and a forward tractor 10' are shown as connected together by a pair of beams 11 and 11'. These beams are connected to brackets 12 and 12' which are supported for swinging movement on vertically aligned pins 14 and 15 on the rear tractor and 14' and 15' on the forward tractor. The pins extend through bearing members 16 and 17 and 16' and 17', respectively, and are supported in brackets 18 and 19 and 18' and 19' which are welded or otherwise suitably secured to the end of the tractors. Double acting hydraulic jacks 21 and 22 extend between the brackets 18 and the beam 11 and jacks 21' and 22' extend between the bracket 18' and beam 11'. Conventional fluid circuitry and control valves are employed for supplying fluid to opposite ends of each pair of jacks in order to impart angular movement between each tractor and its connecting beam 11 or 11'. This type of steering is well known in the industry and need not be further described here to enable an understanding of the present invention. It does enable, however, a very versatile use of the two tractors permitting them to be steered in three different ways for three different purposes. For example as shown in FIG. 2 with the forward tractor 10' turned without turning the rear tractor, a gradual turn may be negotiated. With both sets of jacks actuated to simultaneously turn the rear tractor 10 to the position illustrated in dotted lines a very sharp curve may be negotiated.

A third type of steering or manipulation of the two vehicles when a very large heavy machine is to be used for compacting purposes is accomplished by turning the forward tractor to the position shown in FIG. 2 and the rearward tractor to the position opposite the dotted line position whereby the rear tractor follows the forward tractor in a position offset to one side with each of the four wheels tracking in an individual path and thus compacting double the area compacted by the tractors when they are aligned. Steering is limited to a safe angle by contact between ears 24 and 25 on bracket 18 and two ears, one shown at 25', on bracket 18' with the edges of the supporting members 12 and 12'. The beams 11 and 11' are pivotally mounted on two pins 26 and 26' supported in coaxial positions by the members 12 and 12' and extending through lugs 13 and 13' formed on the beams. This enables relative oscillation on a common longitudinal axis so that the individual tractor units can rock from side to side in passing over undulating terrain.

This rocking motion is also limited by stops shown in FIGS. 1 and 4 at 27' as projecting from the member 12' in a position to intercept the beam when it rocks to the dotted line position shown in FIG. 4. Similar projections are shown at 27 as carried by the member 12 in FIG. 3 for limiting the oscillating movement of the beam 11'.

It is apparent from the disclosure that by removing a few pins and disconnecting hydraulic hoses the entire steering and connecting means may be removed from the two tractors which may then be used separately. It is also possible to provide removable connections between the tractors and the brackets such as shown at 18 and 19 so that even these brackets can be removed leaving the tractors more nearly like their original condition. This enables a contractor when necessary to couple two tractors for use in very heavy pushing or compacting operations but also to use the tractors separately as the draft portion of a scraper or wagon combination.

I claim:

1. A steering coupling for use between two tractors coupled for use as a single machine comprising similar vertically spaced beams extending from each tractor toward but not entirely to the other tractor, power means to impart angular movement in a generally horizontal plane between both tractors and their respective beams to cause steering action of the machine, and means connecting each beam to the other on a common horizontal pivotal axis.

2. The combination of claim 1 in which said power means is at least one double acting hydraulic jack for each tractor.

References Cited by the Examiner
UNITED STATES PATENTS 2,614,644    11/1952    Gustafson _____ 180—79.2
2,930,631    3/1960     Voorhees _____ 180—79.2

MILTON BUCHLER, *Primary Examiner.*
BENJAMIN HERSH, *Examiner.*
J. H. BRANNEN, *Assistant Examiner.*